June 8, 1937.  F. C. BEST  2,082,775
MOTOR VEHICLE
Filed April 28, 1934  2 Sheets-Sheet 1
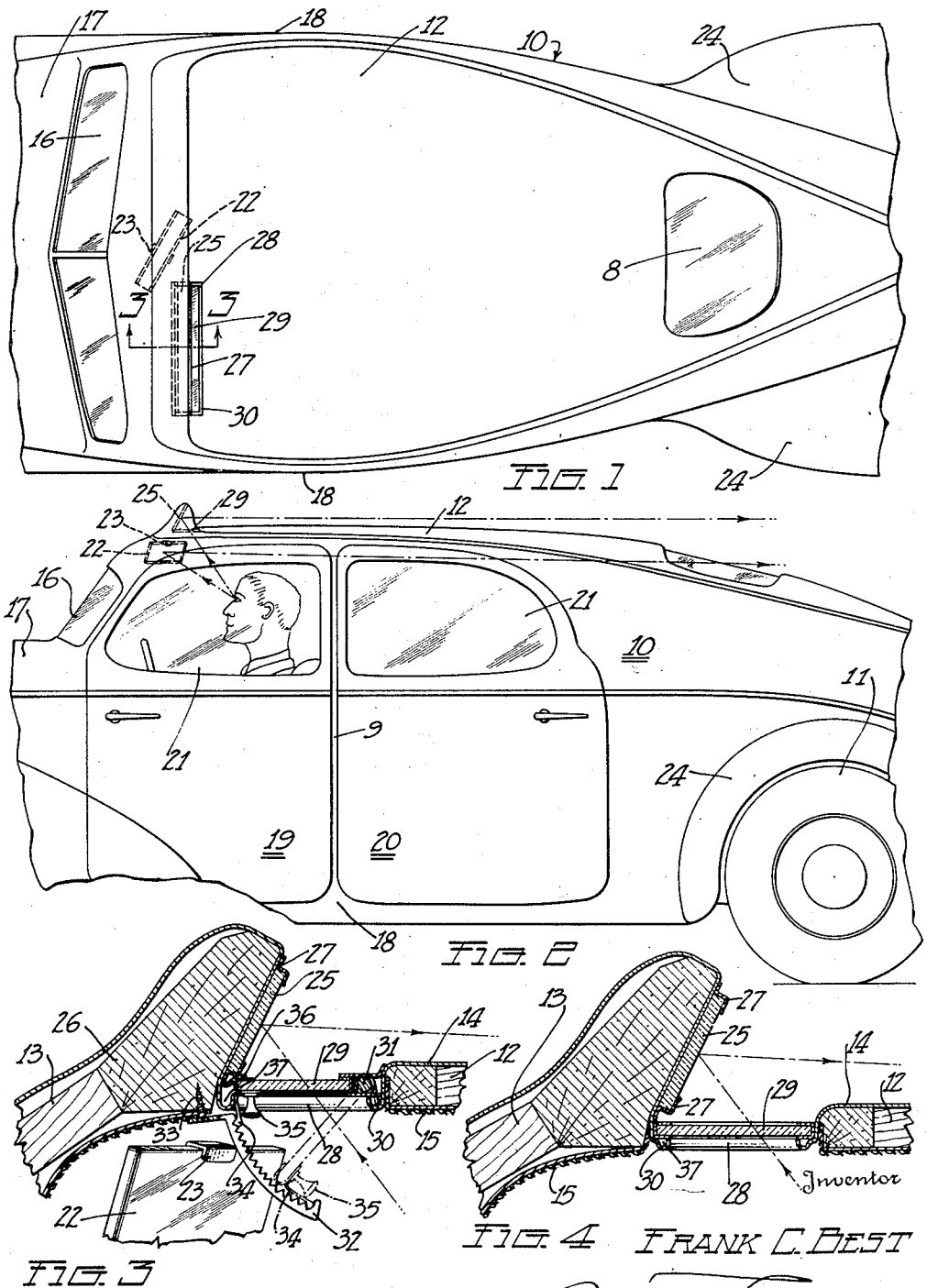
Frank C. Best June 8, 1937.　　　　F. C. BEST　　　　2,082,775
MOTOR VEHICLE
Filed April 28, 1934　　　2 Sheets-Sheet 2

Inventor
FRANK C. BEST
By Mellon Sickles
Attorney

Patented June 8, 1937

2,082,775

UNITED STATES PATENT OFFICE 2,082,775

MOTOR VEHICLE

Frank C. Best, Detroit, Mich., assignor to Packard Motor Car Company, Detroit, Mich., a corporation of Michigan Application April 28, 1934, Serial No. 722,879

4 Claims. (Cl. 296—137)

This invention relates to motor driven road vehicles and more particularly to vehicle bodies of the closed type.

The large majority of vehicles now being manufactured are equipped with closed bodies from within which the driver's vision is defined by the windshield, the side windows and the rear window. Between such means, and particularly between the side and rear windows, the driver's vision is entirely obscured so that his range of vision around the body is considerably less than 360°. This condition is becoming more pronounced with the increasing tendency to stream line bodies in order to obtain aerodynamic efficiency. The driver's vision from within the present vehicles is helped some by the employment of a rear vision mirror exteriorly of the side of the body but full rear vision is not thereby obtained, and as it is necessary for the driver to turn his head away from the road in order to see the side mirror, driving safety is thus reduced.

An object of the invention is to provide a closed body equipped so that the driver therein will have a substantially unobscured vision entirely around the vehicle.

Another object of the invention is to provide a closed stream line body within which a driver will have a rear view, beyond that afforded through the rear window, without turning his head from a position such that he can see the road through the windshield.

A further object of the invention is to provide a body with rear vision means which can be adjusted to promote body ventilation.

Still another object of the invention is to provide a new and novel form of rear vision means for a closed motor vehicle body.

Other objects of the invention will appear from the following description taken in connection with the drawings, which form a part of this specification, and in which:

Fig. 1 is a plan view of a vehicle incorporating my invention;

Fig. 2 is a side elevational view of the same;

Fig. 3 is a sectional view taken on line 3—3 of Fig. 1 showing the rear vision and ventilating means;

Fig. 4 is a similar sectional view with a modified form of vision means;

Figure 5:
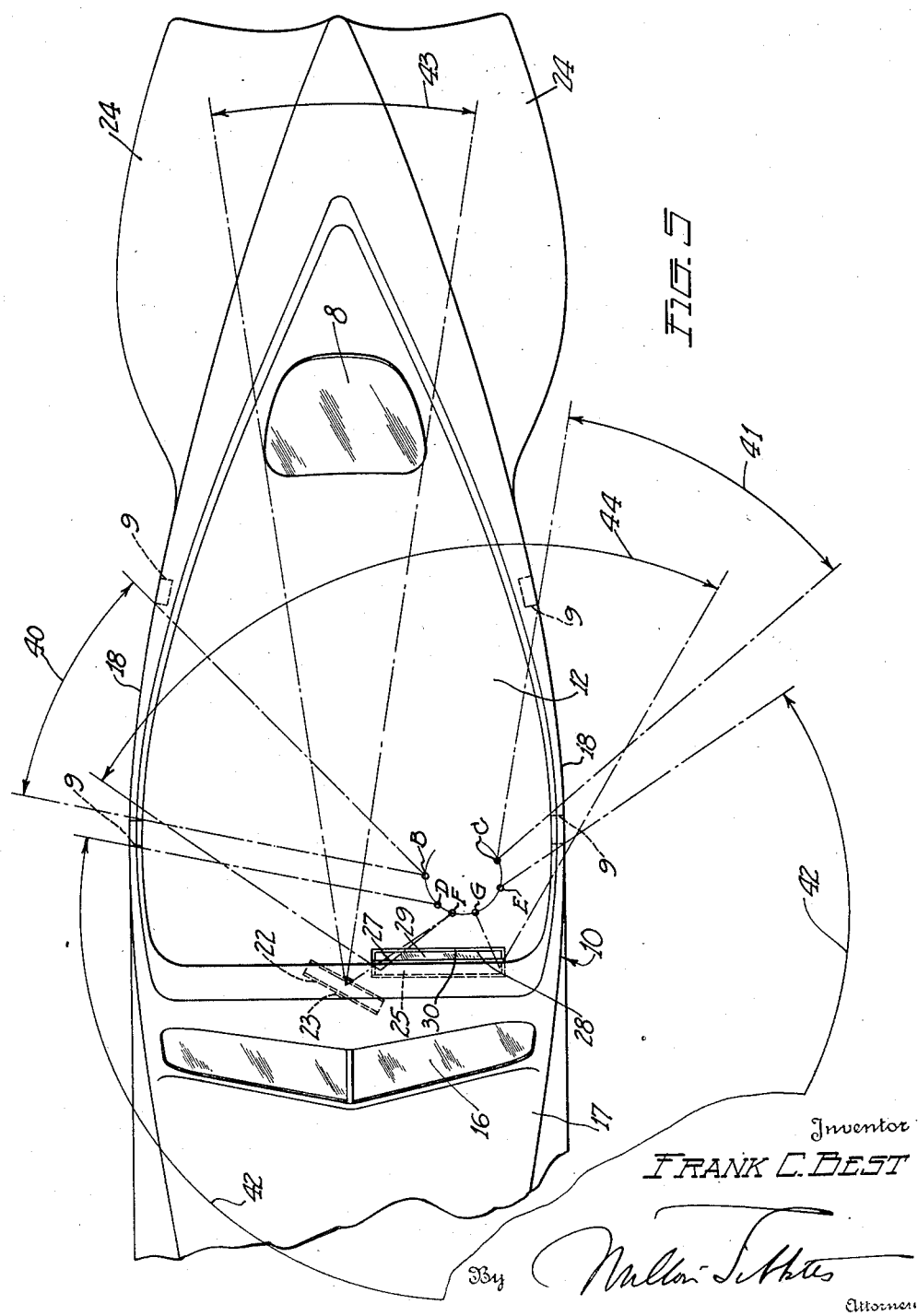
Fig. 5 is a plan view of the vehicle showing diagrammatically the vision of the driver seated within the body.

Referring now to the drawings by characters of reference, 10 indicates generally the body of a motor driven vehicle which is carried by a suitable frame structure (not shown) mounted upon wheels, as indicated at 11. The body may have a conventional frame structure, 12 indicating the roof portion, 13 the front header bar and 9 the side portion. Panel means 14 covers the exterior of the roof structure and the interior has the usual lining 15 fixed thereto.

Below the header bar is a V-type windshield 16 and in front thereof is the cowl 17. The sides 18 of the body have openings therein which are closed by doors 19 and 20 provided with the usual windows 21 and the roof has a rear window 8 therein through which rear vision can be had by the driver when looking at the conventional mirror 22 fixed to the header bar by bracket 23. Fenders 24 overlie the wheels in the usual manner.

The body is of the stream line type having the sides converging toward the rear into a point and the top curving downwardly toward the rear. The rear window is substantially in line with the rear vision mirror which places it a considerable distance behind the rear doors where the roof is narrow so that the paneling between the rear side windows and the rear window materially obscures the driver's rear vision. This form of body is considered aerodynamically correct and thus it becomes requisite that the rear vision in such bodies be materially improved if driving is to be safe. To this end, I propose to provide a rear vision mirror 25 above the roof of the body which can be utilized by the driver without shifting his head any material extent from a position in which he can look through the windshield.

The header bar has a portion 26 extending transversely above and at the forward end of the roof structure 12. To the paneling covering the rear face of the header bar extension 26 is secured bracket means 27 for holding the rear vision mirror 25 and, in order that the driver may see this mirror, the roof structure is provided with an opening 28. Such opening can also be utilized to ventilate the body, as will hereinafter appear.

Closure means can be provided for the opening which consists of a glass window 29 held in a frame 30. As illustrated in Fig. 4, the closure means is removable while the closure means in Fig. 3 is adjustably associated with the roof panel by means of a hinge 31. A pair of arcuate rack members 32 are arranged on each side of the hinged closure member and are secured by screws 33 to the header bar. At the sides of the hinged closure means is fixed latch members 34, such members being formed of spring metal arranged to engage the racks to secure the closure means in various hinged positions. On the closure means is a button 35 by means of which it can be swung on its hinge. Suitable sealing means, as indicated at 36, can be utilized to make the joint between the closure means and the roof paneling leakproof and, in addition, the paneling adjacent the opening is bent to form a gutter 37 which can be suitably drained to lead water away from the interior of the vehicle body.

It is well known that there is a low pressure area at the front of the roof behind the top of the header because of the air banking off of the windshield and flowing rearwardly and, by extending the header bar upwardly as I have done, this low pressure area is pronounced. With the opening through the roof in such low pressure area, air from within the body is drawn outwardly and hence, with the windows open and the closure means open, efficient body ventilation will result. Of course, by adjusting the position of the hinged closure member, the size of the opening will be regulated so that the rate of air flow from the body will be controlled. Adjustment of the closure means will in no way interfere with the driver's vision from the rear view mirrors.

With this arrangement of windows, windshield and rear view mirrors, the driver is able to see substantially all around the vehicle and, from a standpoint of vision, maximum safety will result. In Fig. 5 of the drawings, B represents the position of the driver's eyes in looking through the rear side window at the right of the vehicle and, in this position, the range of vision is indicated by the arcuate line 40. C represents the position of the driver's eyes in looking through the rear side window at the left of the vehicle and, in this position, the range of vision is indicated by the arcuate line 41. When the driver's eyes are turned in a range between D and E, his range of vision is through the front side windows and the windshield, as defined by the arcuate line 42. When the driver's eyes are at F and he looks into the lower rear view mirror, his vision is through the rear window and, in this instance, his range of vision is indicated by the arcuate line 43.

The range of vision defined in the foregoing paragraph is that present in substantially all vehicles now being manufactured. The vision obscured by the paneling is the distance between the rear edges of the rear side windows and the rear window, as illustrated by the distance between the lines defining the ends of line 43 and the adjacent end of lines 40 and 41, such spaces being known as "blind spots". By looking into the exterior mirror with the eyes turned in a range between F and G rear vision is unimpaired, the range of such vision being indicated by the arcuate line 44. It will thus be seen that, by merely turning or tilting his head, the driver of a vehicle will have a substantially 360° vision around the closed body in which he is seated and consequently safety is thus increased.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In combination with a vehicle body having a roof and an opening therein, a header in front of said opening projecting well above the top surface of the roof therebehind, and a rear view mirror mounted on said header in front of said opening within the upper contour of said header.

2. In combination with a vehicle body having a roof and an opening therein, a header integral with the roof supporting structure of the vehicle in front of said opening, and projecting well above the top surface of the roof, a roof portion covering said header with a face portion thereof inclined to and facing the rear of said vehicle, and a rear view mirror rigidly fixed to said face portion of said header.

3. In combination with a vehicle body having a roof and an opening therein, a transverse header bar immediately in front of said opening projecting well above the top surface of the roof therebehind, and a rear vision mirror rigidly supported on the header at the rear face thereof, said mirror being disposed in the zone of the header and above the top of the roof in front of said opening.

4. In combination with a vehicle body having a roof and an opening therein, a header bar immediately in front of said opening projecting well above the top surface of said roof therebehind and having a face portion inclined to and facing the rear of said vehicle, and a rear view mirror rigidly secured against said face in front of and above said opening.

FRANK C. BEST.